US008464545B2

(12) United States Patent
Lutz

(10) Patent No.: US 8,464,545 B2
(45) Date of Patent: Jun. 18, 2013

(54) APPARATUS AND METHOD FOR COLLECTING AN ATMOSPHERIC GAS

(76) Inventor: Dale Robert Lutz, Maplewood, MN (US)

( * ) Notice: Subject to any disclaimer, the term of this patent is extended or adjusted under 35 U.S.C. 154(b) by 571 days.

(21) Appl. No.: 12/526,269

(22) PCT Filed: Jan. 20, 2008

(86) PCT No.: PCT/US2008/051533
§ 371 (c)(1),
(2), (4) Date: Sep. 25, 2010

(87) PCT Pub. No.: WO2008/103512
PCT Pub. Date: Aug. 28, 2008

(65) Prior Publication Data
US 2011/0009499 A1    Jan. 13, 2011

Related U.S. Application Data

(60) Provisional application No. 60/900,564, filed on Feb. 9, 2007, provisional application No. 60/905,377, filed on Mar. 7, 2007.

(51) Int. Cl.
*F25B 27/00* (2006.01)

(52) U.S. Cl.
USPC .......................................... 62/235.1; 136/246

(58) Field of Classification Search
USPC ............ 60/780; 62/611, 291, 235.1; 136/246
See application file for complete search history.

(56) References Cited

U.S. PATENT DOCUMENTS

| 3,488,401 A | 1/1970 | Ames |
| 5,269,851 A | 12/1993 | Horne |
| 6,945,063 B2 * | 9/2005 | Max .............................. 62/235.1 |
| 7,073,348 B2 | 7/2006 | Clodic et al. |
| 7,378,561 B2 | 5/2008 | Olah et al. |
| 2004/0204503 A1 | 10/2004 | Beyer |
| 2006/0235091 A1 | 10/2006 | Olah et al. |
| 2006/0289003 A1 | 12/2006 | Lackner et al. |

FOREIGN PATENT DOCUMENTS

| JP | 12-317302 A | 11/2000 |
| WO | 2006008482 A1 | 1/2006 |

OTHER PUBLICATIONS

George A. Olah, Alain Goeppert, G. K. Surya Prakash, "Beyond Oil and Gas: The Methanol Economy," 2006, preface and pp. 167, 172, 214, 224, 232, 239-243, 245, and 255-258, Wiley-VCH Verlag GmbH & Co. KGaA, Weinheim, Germany.
George A. Olah, "Beyond Oil and Gas: The Methanol Economy," Angew. Chem. Int. Ed. 2005, 44, 2636-2639. See second column of p. 2637 through end of the article.

* cited by examiner

*Primary Examiner* — Robert A Hopkins
(74) *Attorney, Agent, or Firm* — Dale Robert Lutz

(57) ABSTRACT

A system for extracting a target atmospheric gas from an atmosphere, including a carbon-neutral energy source and a cooling unit connected to a condenser, is disclosed. An optional collection chamber and optional reaction chamber are also disclosed. Also disclosed are a method of providing hydrocarbon feedstocks, a method of removing a gas from an atmosphere, and a method of reducing the concentration of the greenhouse gas carbon dioxide in the earth's atmosphere.

14 Claims, 5 Drawing Sheets

Traditional "Carbon-Positive" Energy Production

APPARATUS AND METHOD FOR COLLECTING AN ATMOSPHERIC GAS

FIELD OF THE INVENTION

This invention relates to a system and method for extracting a target atmospheric gas from an atmosphere, based on a carbon-neutral energy source powering a cooling unit. The collected target gas may be chemically reacted to produce other materials. More specifically, this invention may be used to produce a net reduction in the atmospheric concentration of the greenhouse gas carbon dioxide. The carbon dioxide removed from the atmosphere may be converted to hydrocarbon feedstocks.

BACKGROUND

The Intergovernmental Panel on Climate Change (IPCC) report released by the United Nations on Feb. 2, 2007 states that it is unequivocal that climate change due to global warming is occurring and that it is at least 90 percent certain that humans are responsible. A major cause of this warming is the increased concentration of the "greenhouse gas" carbon dioxide ($CO_2$) in the atmosphere, primarily due to humans burning hydrocarbon fossil fuels to produce energy for transportation and electrical power generation. See FIG. 1. To address the problem of global warming, several countries who are signatories of the Kyoto Protocol agreement are establishing laws to reduce the rate of carbon dioxide emission within their jurisdictions. Several state and local governments in the United States of America are also implementing such laws. One of the legal approaches being used in Europe and elsewhere is a "cap and trade" system. With this approach, decreasing annual limits are set on the total amount of carbon dioxide emitted by each company. Companies that go over their annual cap might be fined. However, efficient companies that emit less than their cap amount earn "carbon credits" that can be sold or traded to excess emitters.

A Feb. 3, 2007, newspaper article by Thomas H. Maugh II and Karen Kaplan of the Los Angeles Times states that the IPCC report "also said warming would continue even in the extremely unlikely event that global carbon dioxide could be stabilized at its current level. Such a stabilization would require an immediate 70 percent to 80 percent reduction in emissions, said Richard Somerville of the Scripps Institution of Oceanography in San Diego." The carbon dioxide level persists and builds up because the only natural mechanism for "permanently" removing carbon dioxide from the atmosphere is the process of photosynthesis, in which plants use energy from sunlight to convert carbon dioxide and water into plant tissue materials such as sugars and cellulose. The total plant population of the earth cannot consume carbon dioxide at a rate equal to the current rate of carbon dioxide emission from human activities. Carbon dioxide can be "temporarily" removed from the atmosphere when it dissolves in bodies of water such as the ocean, forming carbonic acid. This carbonic acid raises the acidity of the water, endangering the lifeforms living in the bodies of water. Recent "bleaching" of coral reefs has been attributed to this acidification of the ocean, accompanied by the water temperature increases due to global warming. However, if the "carbonated" water warms up or the air pressure above the water is reduced, some of the carbonic acid decomposes and carbon dioxide is released back into the air. An example of this decomposition process is the $CO_2$ bubble formation and "fizzing" which results from the pressure release upon opening a container of a carbonated beverage.

In order to meet $CO_2$ emission reduction targets of present or future regulations such as those based on the Kyoto Protocol, some power generation stations are experimenting with an approach called "carbon sequestration." In this approach, $CO_2$ gas emitted during the burning of coal or other fossil fuels is trapped at the source and pumped underground. In favorable locations, this gas could be used to pressurize underground petroleum reservoirs, to enhance oil recovery. However, there is no guarantee that the $CO_2$ will not eventually leak back to the surface and re-enter the atmosphere.

There is currently a social movement to develop and deploy "carbon-neutral" technologies for energy generation, technologies that do not emit carbon dioxide. An example of this would be a wind turbine generator. While considerable $CO_2$ might be emitted generating the energy used in manufacturing a wind turbine, when the final device is in operation, no additional $CO_2$ is released. Thus, the manufacturing process may be "carbon-positive" (net $CO_2$ emissions), but the operation of the finished wind turbine is "carbon-neutral". If the process of manufacturing a second turbine uses an amount of energy equal to the lifetime energy output of the first turbine, then both the manufacturing of the second turbine and its total energy output will effectively be completely "carbon-neutral". For purposes of this patent application, technologies that are "carbon-neutral" in operation will be referred to as "carbon-neutral" energy sources. Other "carbon-neutral" energy technologies can include solar photovoltaic, solar thermal, hydroelectric, tidal hydroelectric, nuclear, and geothermal.

While the electrical utilities industry is currently developing approaches that may take them at least part way to their $CO_2$ reduction targets, the transportation industry, and particularly airplanes and ocean-going vessels, have more difficult challenges. Vehicles must generally carry their fuel or energy source with them over long distances. Batteries or fuel cells may work for automobiles, once the technology and the "refueling" infrastructure are developed, but these energy sources tend to be heavy, and sometimes bulky. Airlines in particular require light weight, compact, efficient energy sources, and it is difficult to see how fossil fuels and their accompanying $CO_2$ emissions would be replaced in this industry any time soon. Therefore, the airline industry (and others) will be strongly "carbon-positive" for the foreseeable future. In "cap and trade" countries, such industries will be under pressure to buy increasing amounts of increasingly expensive "carbon credits" from other companies. If a "carbon-negative" technology could be developed that would collect $CO_2$ from the atmosphere and convert the carbon to a useful non-gaseous form, the industries that are forced to use fossil fuels could use this $CO_2$ collection/remediation technology to offset their emissions, thereby meeting their net $CO_2$ emission cap targets.

Some preliminary efforts have been made at developing technologies that could chemically convert greenhouse gases such as $CO_2$ into other materials using process that might be considered carbon-negative. See, for example, U.S. Pat. No. 7,140,181, "Reactor for solar processing of slightly-absorbing or transparent gases", Jensen, et al., and U.S. Pat. No. 6,066,187, "Solar reduction of CO.sub.2", also by Jensen, et al. However, these are energy-intensive, high temperature processes, requiring intense concentrated sunlight and associated expensive equipment. Furthermore, these patents do not address the problem of collecting the greenhouse gas from the atmosphere and concentrating the gas to make the subsequent chemical reaction processes more efficient.

Other useful related technologies are discussed in the following documents: U.S. Pat. No. 4,478,699, "Photosynthetic solar energy collector and process for its use", Hallman, et al.; U.S. Pat. No. 4,240,882, "Gas fixation solar cell using gas diffusion semiconductor electrode", Ang, et al.; and U.S. Pat. No. 4,160,816, "Process for storing solar energy in the form of an electrochemically generated compound", Williams, et al. These patents also do not address the problem of removing the greenhouse gas from the atmosphere.

Thus, there is a need for a technology capable of collecting a target gas such as $CO_2$ from the atmosphere. The collected target gas may then optionally be converted to other, more desirable forms. There is currently a further need to reduce the concentration of the greenhouse gas $CO_2$ in the earth's atmosphere. The present invention can perform both functions.

SUMMARY OF THE INVENTION

One aspect of the invention is a system for extracting a target atmospheric gas from an atmosphere. The system includes a carbon-neutral energy source, and a cooling unit connected to a gas condenser. The carbon-neutral energy source powers the cooling unit, and the cooling unit cools the condenser at least to the condensation temperature of the target atmospheric gas. The target gas could be the greenhouse gas carbon dioxide, in which case operating this system produces a net decrease in the amount of this greenhouse gas in the atmosphere. Examples of carbon-neutral energy sources would include a solar photovoltaic device, a solar thermal device, a wind turbine, a hydroelectric power plant, a tidal hydroelectric power plant, a nuclear power plant, or a geothermal power plant.

The above system may optionally also include a collection chamber enclosing the condenser, for trapping the collected target gas. This collection chamber would have at least one gas entrance port that can be opened and closed.

If the atmosphere contains other gases or vapors that condense at a higher temperature than the target gas, the system may also include a precondenser that is cooled to a temperature above the condensation temperature of the target atmospheric gas, in order to separate those other gases from the target gas.

Some versions of this system could be constructed as a self-contained unit, and could be mobile. The system may optionally include an energy storage means, such as a battery or fuel cell, that could be recharged using the carbon-neutral energy source. Other energy storage means for certain systems could include a compressed gas, a heat reservoir, a capacitor, a pair of magnets, a flywheel, a spring, or water that has been pumped to a higher elevation.

In order to convert the collected target gas to a more useful or more easily stored and transported form, the system may also include a reaction chamber in which the collected target atmospheric gas is reacted with at least a second chemical, such as hydrogen. This hydrogen could be generated from the electrolysis of water, using energy from a carbon-negative energy source, such as the source already used in this system.

This invention also includes a method for collecting a target atmospheric gas, a method of providing hydrocarbon feedstocks, a method of removing a gas from an atmosphere, and, in particular, a method of reducing the concentration of the greenhouse gas carbon dioxide in the earth's atmosphere, all using the system described above.

DETAILED DESCRIPTION

While the current invention may be used in a variety of situations to collect selected gases or vapors from planetary or enclosed atmospheres where carbon-neutral energy sources are available, a particular application of interest is using solar energy to extract greenhouse gases such as carbon dioxide from the earth's atmosphere, thus incrementally reducing global warming. Optionally, solar energy can also be used to chemically convert the carbon dioxide to other carbon compounds that do not contribute to global warming, and that may be useful in their own right.

Because about 6 billion tons of carbon dioxide are released into the atmosphere by the burning of fossil fuels every year, any system used to significantly reduce the amount of $CO_2$ and other greenhouse gases in the atmosphere would need to be widely deployed, self-contained, and energy efficient. The "raw materials" available across much of the earth's surface for such a system include air, water, and sunlight. Our air composition is now approximately 80% nitrogen ($N_2$) and 20% oxygen ($O_2$), with a small amount of water vapor ($H_2O$) that varies with humidity and temperature, and about 380 parts per million (ppm) of carbon dioxide ($CO_2$). However, glacial ice core studies indicate that the $CO_2$ concentration had never been above about 280 ppm in the last 650,000 years, until the beginning of the industrial age around the year 1750.

One method of removing $CO_2$ from the atmosphere could take advantage of the difference in condensation temperatures of these gases and vapors. At normal atmospheric pressure, water normally condenses to a liquid at some temperature below room temperature (the dew point), and solidifies to ice at 0° C. $CO_2$ condenses directly to a solid ("dry ice") at −79° C., and converts back to a gas (sublimes) when heated above that temperature. $O_2$ and $N_2$ condense to liquids at −183° C. and −196° C., respectively. Thus, if air comes in contact with a surface having a temperature slightly below −79° C., any $H_2O$ and $CO_2$ in the air will deposit on the surface as a mixture of ice and dry ice. These two components could be separated by a 2-stage cooling process. If the air first comes in contact with a surface having a temperature between the dew point and 0° C., the water vapor would condense out as a liquid, which could be drained away, and the air would now be "dry". If the dry air then comes in contact with a surface having a temperature slightly below −79° C., relatively pure $CO_2$ would then condense on the surface. This collected $CO_2$ could then be stored or chemically reacted to remove this greenhouse gas from the atmosphere.

Figure 1:
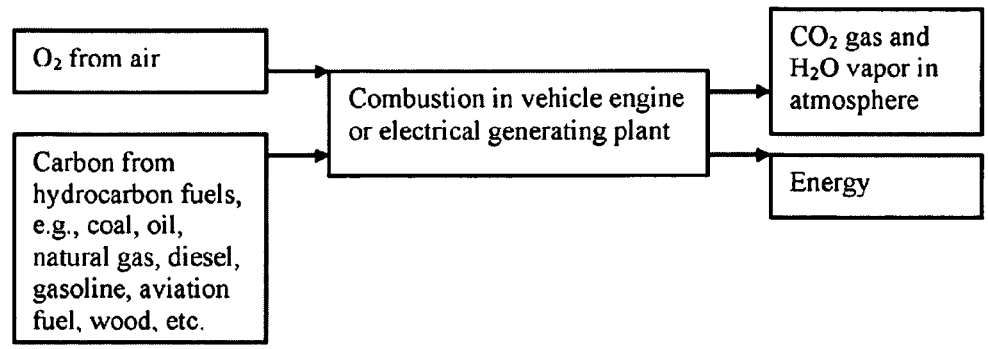
FIG. 1 schematically illustrates the net increase of the greenhouse gas carbon dioxide in the atmosphere as a result of burning hydrocarbon fuels to produce energy.
Figure 2:
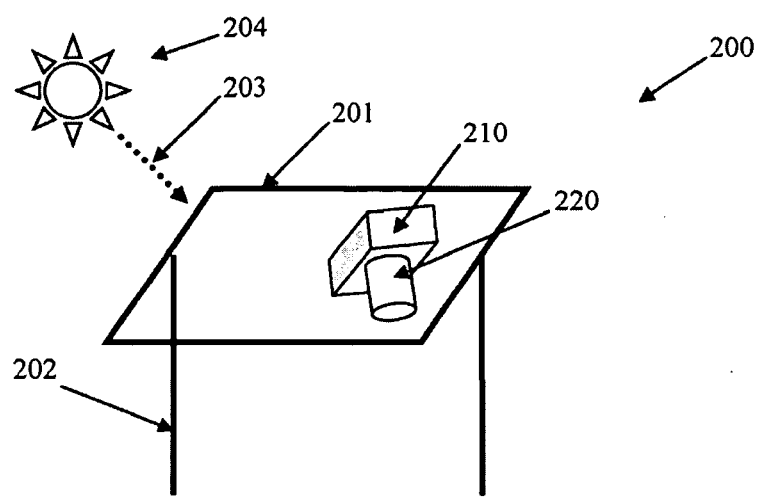
FIG. 2 shows an embodiment of a solar-powered gas collector of this invention.

FIG. 2 illustrates a first embodiment of the present invention. Gas collector system 200 includes a "carbon-neutral" energy source, in this case a photovoltaic solar panel 201. A suitable example would be one or an array of SunPower model SPR-90, available from SunPower Corporation, Sunnyvale, Calif., USA. Solar panel 201 mounted on supports 202 receives electromagnetic energy 203 from a source 204, such as the sun. Panel 201 converts electromagnetic energy 203 to electrical energy, which powers cooling unit 210. In this example, cooling unit 210 is shaded from direct sunlight by solar panel 201, thus reducing the heat load on cooling unit 210 and making the system more efficient. If the target gas to be collected is atmospheric $CO_2$, cooling unit 210 must be capable of cooling condenser 220 to less than $-79°$ C. when supplied with adequate power. The cooling unit could be selected from any of a variety of technologies, such as Joule-Thomson coolers, Peltier coolers, Stirling coolers, pulse tube cryocoolers, thermoelectric coolers, etc. When the condenser is at a temperature less than $-79°$ C., water vapor and carbon dioxide from the air in contact with the condenser will form a coating of deposited ice and dry ice on the surface of the condenser. In this embodiment, the system will need to be monitored such that the deposited material can be periodically removed from the surface of the condenser and stored. In particular, the deposited material would need to be collected when it is anticipated that insufficient power will be available to keep the condenser temperature at less than $-79°$ C., such as near sunset or on overcast days.

The system in FIG. 2 could optionally be configured as a self-contained, mobile unit. Systems such as in FIG. 2 also could be advantageously used at high altitudes or high latitudes (e.g., above the Arctic Circle), at locations where the ambient temperature is between $0°$ C. and $-79°$ C., because water vapor would already be removed from the atmosphere as snow and ice. Also, the cooling unit would require less power, since it needs to cool the condenser a smaller number of degrees from the ambient temperature. However, even though the sun is visible up to 24 hours per day in the summer above the Arctic Circle, the sunshine strikes the earth's surface at a low angle, and thus provides only limited heating to the earth's surface. A more vertically mounted solar panel on a mount that tracks the sun could partially overcome this problem. As a second alternative, carbon-free electrical energy could be generated at solar power stations nearer the equator, such as in the deserts of Arizona, and the power could be transmitted to $CO_2$ collectors in northern Canada and Alaska, if sufficiently low loss transmission lines were available. As a third alternative, wind turbines could be substituted for solar panels as the carbon-free power source at high latitudes.

Figure 3:
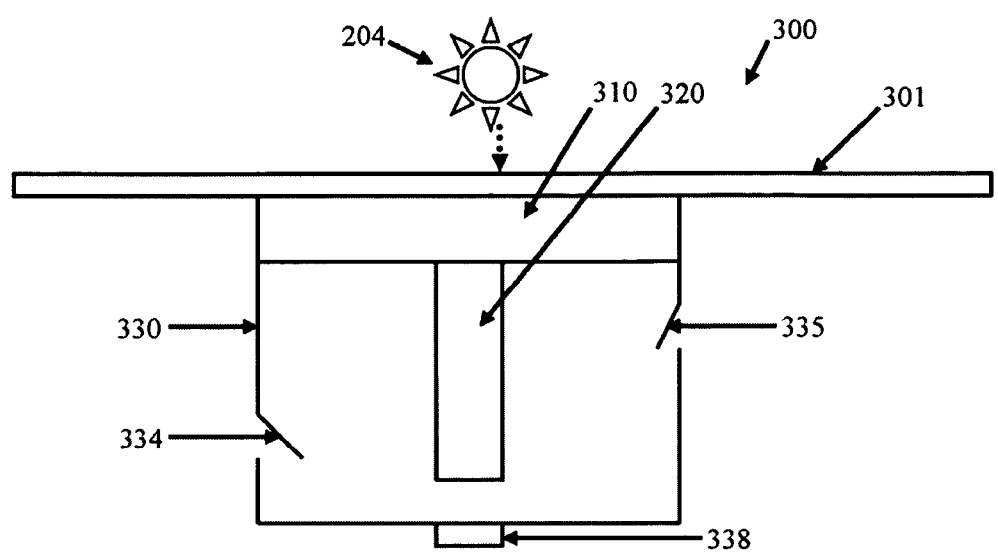
FIG. 3 shows a cross-section view of a second embodiment of a solar-powered gas collector of this invention.

FIG. 3 shows a cross-sectional view of a second embodiment of the present invention. Gas collector system 300 includes a "carbon-neutral" energy source, again a photovoltaic solar panel, 301. Panel 301 converts electromagnetic energy from the sun 204 to electrical energy, which powers cooling unit 310. The target gas to be collected is again atmospheric $CO_2$. In this embodiment, the chilled condenser 320 is enclosed in a collection chamber 330 that has at least one gas entrance port 334, and optionally one or more gas exit ports 335. Collection chamber 330 may also have an extraction port 338 to facilitate removal of the collected target gas from collection chamber 330. Gas entrance port 334 may function as a check valve, opening to allow air flow into collection chamber 330 when the pressure outside 330 is greater than the pressure inside, but closing to form an airtight seal when the pressure inside chamber 330 is greater than the air pressure outside. When cooling unit 310 is energized and condenser 320 is cooled, the air within the collection chamber will be cooled and will contract, reducing the pressure within collection chamber 330 below the pressure of the outside air, causing a check valve at gas entrance port 334 to open and allow more air to flow into collection chamber 330. The target gas (e.g., $CO_2$) in the added air will condense as a liquid or solid on the condenser, further reducing the interior pressure in collection chamber 330, continuing the process. If condenser 320 is then allowed to warm above the condensation temperature of the target gas, either for an intentional purge cycle or due to reduced power input to cooling unit 310 (e.g., at night for a solar powered unit), some of the condensed target gas will re-vaporize, raising the pressure in collection chamber 330, clamping the check valve at gas entrance port 334 shut, and trapping the target material in collection chamber 330. Optional extraction port 338 may include a check valve that opens when the pressure inside collection chamber 330 is greater than the pressure on the other side of extraction port 338, thus allowing the collected target material to be directed into a removable container or a permanently attached plumbing system (not shown). Alternatively, if the target gas is being condensed to a liquid rather than a solid, extraction port 338 may include a liquid "trap" seal made of an "S"-shaped pipe, similar to the plumbing traps used under a lavatory sink.

Referring again to FIG. 3, an alternate embodiment having both a gas entrance port 334 and at least one gas exit port 335 can be employed, if it is desired to achieve a greater collection rate of the target gas by causing a continuous flow of air through collection chamber 330 past condenser 320. For this embodiment, entrance port 334 and exit port 335 are normally open when condenser 320 is at or below a desired condensation temperature, and are sealed when condenser 320 is above the desired temperature. To minimize energy usage, the valves in entrance port 334 and exit port 335 could contain bistable valves connected to a valve actuator and a passive temperature sensor that monitors the condenser temperature. Alternatively, entrance port 334 and exit port 335 could contain valves that are held open (e.g., by solenoids) while solar panel 301 is generating sufficient electrical energy, but that close and seal when the electrical output drops below some minimum level. In FIG. 3, collection chamber 330 is arranged with entrance port 334 low on one side of the chamber and exit port 335 high on the other side of the chamber, to encourage increased air flow due to natural convection. Additionally, exit port 335 is located closer than entrance port 334 to solar panel 301, which is heated by direct sunlight. This further enhances the natural convection flow through collection chamber 330, by making air high in the chamber near the exit port warmer. Alternatively, a fan, air pump, or other air flow enhancing device may be included in gas collector system 300.

Figure 4:
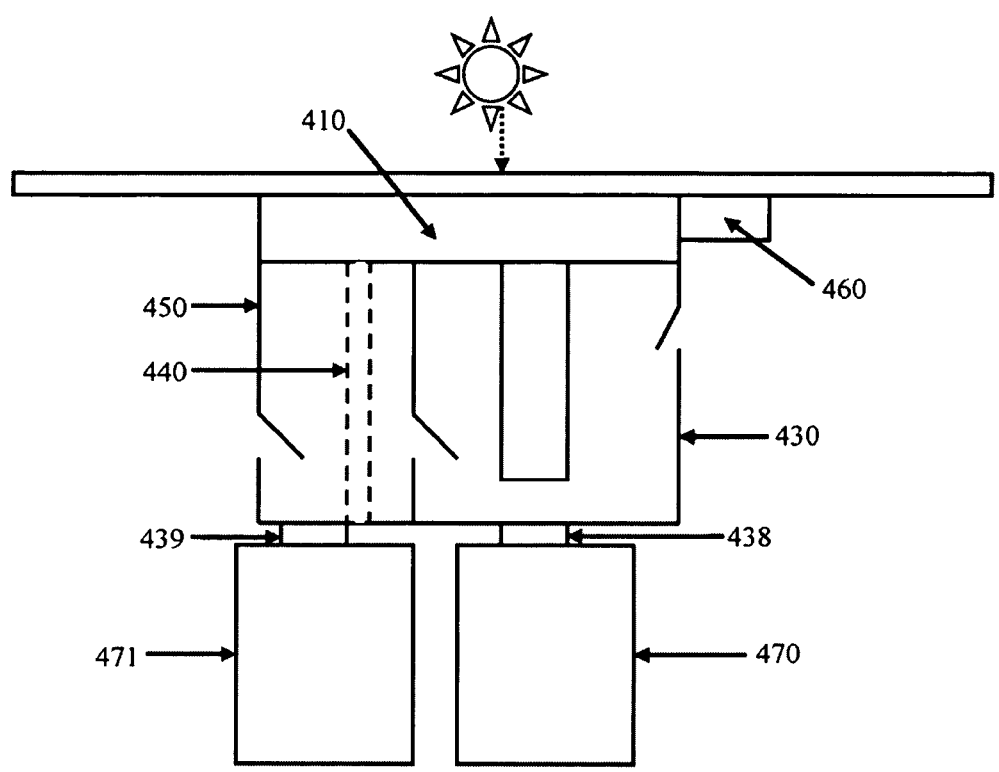
FIG. 4 shows a cross-section view of a third embodiment of a solar-powered gas collector of this invention.

FIG. 4 shows a cross section of yet another embodiment of the present invention. This embodiment is particularly useful if other gases and vapors in the atmosphere condense at a higher temperature than the condensation temperature of the target gas (e.g., water vapor above $0°$ C. and $CO_2$ at $-79°$ C.), or if multiple target gases are desired to be separately collected. This embodiment is similar to that in FIG. 3, with the addition of an optional auxiliary extraction port 439 and a precondenser 440. Items 439 and 440 may be located in collection chamber 430, or they may both be located in a separate precondenser chamber 450, as illustrated in FIG. 4. If it is desired to separately collect water vapor and $CO_2$, or to obtain $CO_2$ that is relatively free of water, precondenser 440 would be connected to cooling unit 410 and maintained at a temperature between the dew point and $-79°$ C., and preferably between the dew point and $0°$ C. Precondenser 440 could be a screen or grid structure, or a series of baffles, that provide significant cold surface area for condensing water vapor, but that still allow adequate air flow to and through the collection chamber 430. Water vapor condensing on precondenser 440 as liquid water would drain down to the bottom of the chamber 430 or 450, where it could be removed through an extraction port 438 or 439. Optional reservoir 470 and auxiliary reservoir 471 could receive and contain $CO_2$ from extraction port 438 and water from auxiliary extraction port 439, respectively. If an auxiliary extraction port 439 is used, it could be a drain with a liquid "trap", as described above for item 338 in FIG. 3. The water removed through auxiliary extraction port 439 could be used as potable water, or for growing plants, or for chemical reactions powered by the same carbon-free energy device, as will be described further in FIG. 5.

An optional energy storage unit 460, such as a battery or a hydrogen fuel cell, is also shown in FIG. 4. Energy storage unit 460 may collect and store excess energy generated by the carbon-free energy source, and then may release this energy to continue operation of the gas collector system 400 when the primary carbon-free energy source output is low (e.g., on partly cloudy days or at night, for a solar panel.)

Figure 5:
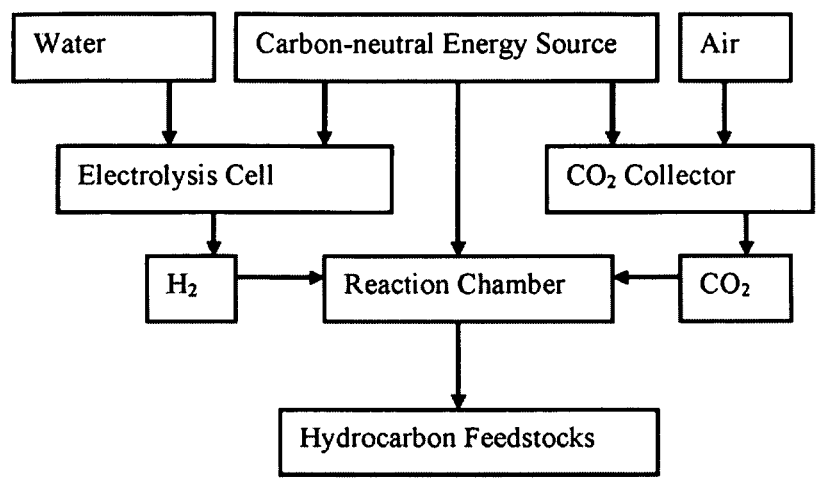
FIG. 5 shows a schematic diagram of a carbon conversion system including the gas collector of this invention.

FIG. 5 shows a group of interconnected processes that use a carbon-neutral energy source, air, and water (the water being either extracted from the air, as in FIG. 4, or from local sources) to remove the greenhouse gas $CO_2$ from the atmosphere and to chemically convert the gas to other chemical compounds or forms of carbon that do not contribute to climate change. These other chemical forms of carbon may be more compact for transport, and may be useful hydrocarbon feedstocks for producing polymers, medicines, (carbon-positive) fuels, or even foodstuffs such as sugars and amino acids. In FIG. 5, a known quantity of relatively pure $CO_2$ is obtained from a gas collection system such as the one shown in FIG. 4. The $CO_2$ could be collected in reservoir 470 of FIG. 4. Also, water obtained from the gas collector in FIG. 4 (e.g., in auxiliary reservoir 471) or from other sources is provided to an electrolysis cell, the cell being powered by a carbon-neutral energy source, possibly the same source that is also used to power the gas collector of FIG. 4. Auxiliary reservoir 471 in FIG. 4 could be such an electrolysis cell. The electrolysis cell splits the water into its elemental components, hydrogen and oxygen, by any of a variety of means commonly known in the art, as shown in equation (1) below.

$$2H_2O + energy => 2H_2 + O_2 \tag{1}$$

A known quantity of the generated hydrogen is then collected and combined with a known amount of $CO_2$ in a reaction chamber. Collection chamber 430 or reservoir 470 in FIG. 4 could also serve as such a reaction chamber. (The generated hydrogen gas could be made to flow back through the collection chamber 430 to reservoir/reaction chamber 470, or a cross-connect pipe could be supplied connecting chambers 471 and 470.) Energy from a carbon-neutral energy source is then applied to the reaction chamber, in the form of one or more of heat, pressure, electromagnetic radiation, or an electric spark/arc, to initiate a chemical reaction between the hydrogen and the carbon dioxide. Optionally, other materials such as nitrogen gas may be introduced into the reaction chamber at some stage in the process. A variety of useful chemical compounds may be produced in the reaction chamber, depending on:
1) the reaction conditions;
2) the relative amounts of hydrogen and carbon dioxide; and
3) the presence of any catalytic species.

For example, the hydrogen could reduce the $CO_2$ to elemental carbon, C, the material of graphite and diamonds, as shown in equation 2.

$$2H_2 + CO_2 + energy => 2H_2O + C \tag{2}$$

Varying ratios of $H_2$ and $CO_2$ under appropriate reaction conditions can also produce a range of other useful hydrocarbons, as shown below.

$$H_2 + CO_2 + energy => HCOOH(\text{formic acid}) \tag{3}$$

$$2H_2 + CO_2 + energy => H_2O + H_2CO(\text{formaldehyde}) \tag{4}$$

$$3H_2 + CO_2 + energy => H_2O + H_3COH(\text{methyl alcohol}) \tag{5}$$

$$4H_2 + CO_2 + energy => 2H_2O + CH_4(\text{methane, natural gas}) \tag{6}$$

Under appropriate conditions, formaldehyde from equation 4 could be converted to polyoxymethylene, a polymer having excellent mechanical and high temperature properties, sold under trade names such as Delrin. See equation (7) below.

$$H_2 + nH_2CO => H-[CH_2-O-]_n-H(\text{polyoxymethylene}) \tag{7}$$

As suggested above, introducing controlled amounts of atmospheric nitrogen gas or other nitrogen compounds into the reaction chamber would permit the synthesis of an even broader range of organic compounds, including foodstuffs such as amino acids.

Although specific embodiments of the invention have been described and illustrated, it is to be understood that a variety of modifications which do not depart from the scope and spirit of the invention will be evident to persons of ordinary skill in the art from the foregoing disclosure.

I claim:

1. A system for extracting a target atmospheric gas from an atmosphere, the system comprising:
   a carbon-neutral energy source;
   a cooling unit;
   a condenser in communication with the cooling unit and in contact with the atmosphere; and
   a collection chamber enclosing the condenser, the collection chamber having at least one gas entrance port, the port having a closure means operable between an open position and a closed position,
   wherein
   the carbon-neutral energy source is adapted to power the cooling unit, and
   the cooling unit is capable of cooling the condenser at least to the condensation temperature of the target atmospheric gas.

2. A system as in claim 1, wherein the carbon-neutral energy source is selected from the group comprising a solar photovoltaic device, a solar thermal device, a wind turbine, a hydroelectric power plant, a tidal hydroelectric power plant, a nuclear power plant, and a geothermal power plant.

3. A system as in claim 1, wherein the target atmospheric gas is carbon dioxide.

4. A system as in claim 1, further comprising a precondenser, the precondenser being cooled to a temperature above the condensation temperature of the target atmospheric gas.

5. A system as in claim 1, wherein the system is a self-contained unit.

6. A system as in claim 1, further comprising an energy storage means.

7. A system for extracting a target atmospheric gas from an atmosphere, the system comprising:
   a carbon-neutral energy source;
   a cooling unit;
   a condenser in communication with the cooling unit and in contact with the atmosphere; and
   a reaction chamber wherein the collected target atmospheric gas is reacted with at least a second chemical,
   and wherein,
   the carbon-neutral energy source is adapted to power the cooling unit, and
   the cooling unit is capable of cooling the condenser at least to the condensation temperature of the target atmospheric gas.

8. A system as in claim 7, wherein the second chemical is hydrogen gas.

9. A system as in claim 8, wherein the hydrogen gas is obtained from electrolysis of water by means of energy from a carbon-neutral energy source.

10. A system as in claim 1 or 7, wherein operation of the system results in a net decrease in the amount of the target gas in the atmosphere.

11. A method for collecting atmospheric carbon dioxide gas for providing hydrocarbon feedstocks, comprising the steps of:
   providing a carbon-neutral energy source;
   providing a cooling unit;
   providing a condenser in communication with the cooling unit;
   obtaining energy from the environment by means of a carbon-neutral energy source;
   using the obtained energy to power the cooling unit such that the cooling unit cools the condenser to a temperature below the condensation temperature of atmospheric carbon dioxide gas;
   exposing the condenser to atmospheric air,
   allowing a desired quantity of atmospheric carbon dioxide gas to condense on the condenser;
   collecting the carbon dioxide from the condenser;
   providing a second carbon-neutral energy source;
   providing an electrolysis cell;
   providing water to supply the electrolysis cell;
   using the second carbon-neutral energy source to power the electrolysis cell;
   electrolyzing the water in the electrolysis cell to produce hydrogen gas;
   collecting the produced hydrogen gas;
   providing a reaction chamber;
   providing a third carbon-neutral energy source to power the reaction chamber;
   introducing the carbon dioxide and hydrogen gas into the reaction chamber; and
   using energy from the third carbon-neutral energy source with the reaction chamber to cause a chemical reaction between the hydrogen gas and carbon dioxide to produce hydrocarbon feedstocks.

12. The method of claim 11, wherein at least two of the first, second and third carbon-neutral energy sources are the same device.

13. A method of removing carbon dioxide from an atmosphere, comprising the method of claims 11 or 12.

14. A method of reducing the concentration of the greenhouse gas carbon dioxide from the earth's atmosphere, comprising the method of claim 13.

* * * * *